(12) United States Patent
Pandit et al.

(10) Patent No.: US 11,922,520 B2
(45) Date of Patent: Mar. 5, 2024

(54) DETERMINING SIGNIFICANT EVENTS WITHIN AN AGRIBUSINESS SYSTEM

(71) Applicant: International Business Machines Corporation, Armonk, NY (US)

(72) Inventors: Sushain Pandit, Austin, TX (US); Krishna Teja Rekapalli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 17/104,015

(22) Filed: Nov. 25, 2020

(65) Prior Publication Data

US 2022/0164900 A1    May 26, 2022

(51) Int. Cl.
| | |
|---|---|
| G06Q 50/02 | (2012.01) |
| G06N 3/08 | (2023.01) |
| G06N 20/00 | (2019.01) |
| G06Q 10/08 | (2023.01) |
| G06Q 20/38 | (2012.01) |
| G06Q 30/0204 | (2023.01) |
| G06Q 50/28 | (2012.01) |

(52) U.S. Cl.
CPC ............. *G06Q 50/02* (2013.01); *G06N 3/08* (2013.01); *G06N 20/00* (2019.01); *G06Q 10/08* (2013.01); *G06Q 20/389* (2013.01); *G06Q 30/0205* (2013.01)

(58) Field of Classification Search
CPC .. G06Q 50/02; G06Q 20/389; G06Q 30/0205; G06Q 50/28; G06N 20/00; G06N 3/08
USPC ........................................................ 706/12
See application file for complete search history.

(56) References Cited

U.S. PATENT DOCUMENTS

| | | | |
|---|---|---|---|
| 9,529,974 B2 | 12/2016 | Li et al. | |
| 9,849,364 B2 | 12/2017 | Tran et al. | |
| 11,270,245 B2* | 3/2022 | Dasari | G06Q 10/0832 |
| 2002/0152088 A1 | 10/2002 | Hogan | |
| 2015/0106434 A1 | 4/2015 | Fiene et al. | |
| 2018/0211156 A1 | 7/2018 | Guan et al. | |
| 2018/0284093 A1* | 10/2018 | Brown | H04L 9/0637 |

(Continued)

FOREIGN PATENT DOCUMENTS

| | | |
|---|---|---|
| WO | 2018102749 A1 | 6/2018 |
| WO | 2020037045 A1 | 2/2020 |
| WO | 2020055950 A1 | 3/2020 |

OTHER PUBLICATIONS

Khan, "IoT-Blockchain Enabled Optimized Provenance System for Food Industry 4.0 Using Advanced Deep Learning" May 25, 2020 (Year: 2020).*

(Continued)

*Primary Examiner* — Charles Guiliano
*Assistant Examiner* — Po Han Lee
(74) *Attorney, Agent, or Firm* — Grant Johnson (57) ABSTRACT

A computer-based method, system, and computer program product for automatically identifying significant events for food traceability. The method may comprise receiving a series of events from an agriculture supply chain entity, automatically determining, at a machine learning model of an event analysis module, one or more events in the series having a significance for food traceability greater than a threshold, and automatically reporting the one or more events to a ledger.

20 Claims, 6 Drawing Sheets

(56) References Cited

U.S. PATENT DOCUMENTS

| | | | | |
|---|---|---|---|---|
| 2018/0285810 | A1* | 10/2018 | Ramachandran | G06Q 10/087 |
| 2019/0057460 | A1 | 2/2019 | Sakaguchi et al. | |
| 2019/0150357 | A1* | 5/2019 | Wu | H04N 7/188 |
| 2019/0180276 | A1* | 6/2019 | Lee | H04L 9/3247 |
| 2019/0331832 | A1 | 10/2019 | Chandra et al. | |
| 2020/0126232 | A1 | 4/2020 | Guo et al. | |
| 2021/0064034 | A1* | 3/2021 | Ouyang | B63B 79/15 |
| 2021/0073540 | A1* | 3/2021 | Tran | A01G 25/09 |
| 2021/0209705 | A1* | 7/2021 | England | G06N 20/00 |
| 2021/0366586 | A1* | 11/2021 | Ryan | G06Q 20/20 |
| 2022/0343440 | A1* | 10/2022 | Zimmers | G06Q 30/0613 |

OTHER PUBLICATIONS

"IoT, Big Data, and Artificial Intelligence in Agriculture and Food Industry" to Misra et al., May 28, 2020 (Year: 2020).*

Singh et al., "Effective Agriculture and Environment Monitoring", U.S. Appl. No. 16/702,861, filed Dec. 4, 2019.

Ko, D. et al., "Real Time Traceability and Monitoring System for Agricultural Products Based on Wireless Sensor Network", Hindawi Publishing Corporation International Journal of Distributed Sensor Networks, vol. 2014, Article ID 832510, 7 pages, Published Jun. 24, 2014.

Zhu, N.Y. et al., "Deep learning for smart agriculture: Concepts, tools, applications, and opportunities", vol. 11 No. 4, Int J Agric & Biol Eng, 13 pages, Jul. 2018.

Shekhar, S. et al., "Intelligent Infrastructure for Smart Agriculture: An Integrated Food, Energy and Water System", Computing Community Consortium, 8 pages.

Wikipedia, "Long short-term memory", 14 pages, downloaded on Oct. 29, 2020 from: https://en.wikipedia.org/wiki/Long_short-term_memory.

"Watson Decision Platform for Agriculture", AI-driven insights for the agriculture ecosystem, The Weather Company, 3 pages, Jan. 2019.

Mell, P. et al., "The NIST Definition of Cloud Computing", Recommendations of the National Institute of Standards and Technology, NIST Special Publication 800-145, 7 pages, Sep. 2011.

* cited by examiner

DETERMINING SIGNIFICANT EVENTS WITHIN AN AGRIBUSINESS SYSTEM

BACKGROUND

The present disclosure relates to agriculture, and more specifically, to a method and system for determining significant events for traceability within an agribusiness ecosystem.

Consumers are increasingly demanding that their food be sustainably produced. As a result, establishing traceability of food across all participants within an agriculture ecosystem has become increasingly important in the marketplace. By establishing an auditable transaction trace/timeline from planting to on-field practices to consumption, large ecosystems of producers/growers, food processors, distributors, retailers, etc. can be held accountable to a pre-determined level of standard by governing bodies. This notion has been socialized as "Farm-to-Fork."

SUMMARY

According to one or more embodiments, a computer-based method for automatically identifying significant events for food traceability. The method may comprise receiving a series of events from an agriculture supply chain entity, automatically determining, at a machine learning model of an event analysis module, one or more events in the series having a significance for food traceability greater than a threshold, and automatically reporting the one or more events to a ledger.

According to one or more embodiments, a computer system for identifying significant events for food traceability. The system may comprise a processor configured to execute instructions that, when executed on the processor, cause the processor to receive a series of events from an agriculture supply chain entity, and determine at a machine learning module of an event analysis module, one or more events in the series having a significance for food traceability greater than a threshold.

According to one or more embodiments, a computer program product for identifying significant events for food traceability. The computer program product may comprise a computer readable storage medium having program code embodied therewith. The program code may be executable by one or more processors, to perform a method comprising receiving a series of events from an agriculture supply chain entity, and automatically determining, at a machine learning model of an event analysis module, one or more events in the series having a significance for food traceability greater than a threshold.

Additional features and advantages are realized through the techniques disclosed herein. Other embodiments and aspects are described in detail herein. Refer to the description below and to the drawings for the various features and aspects disclosed herein.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to agriculture; more particular aspects relate to determining significant events within an agribusiness ecosystem. While the present disclosure is not necessarily limited to such applications, various aspects of the disclosure may be appreciated through a discussion of various examples using this context.

The standards and certifying bodies for sustainability claims vary by country and crop, but typically require an audit trail with participation from all of the various independent entities (e.g., companies) within the agricultural ecosystem. And while technologies such as the "Internet of Things" have made it comparatively easy to collect a large volume of data to support sustainability claims, there remains a fundamental issue in operationalizing such a system, namely that highly trained expert still have to manually establish which data points along a timeline are significant, as well as to determine how they are interrelated in terms of establishing a trace. This need for highly trained experts, however, may cause severe scaling problems, particularly as each field, crop, and growing year combination will have unique characteristics.

For example, a typical agricultural operation on a farm moves through a number of phases. It may start with relatively static artifacts (e.g., field geometries, soil properties, etc.), then move to a pre-seasonal phase in which the planning occurs, and finally an in-season phase where various active events occur, e.g., planting seeds, applying fertilizers, performing irrigation, harvesting crops, etc. These events are typically planned and executed as per the intended yield outcome, local farming practices, weather forecast and historical values, predicted/potentially disruptive events, and similar targets/constraints that influence a typical agribusiness operation. After the growing season is complete, typical post seasonal activities are undertaken, such as transporting the harvested crop to storage in silos, distribution warehouses, food production plants, retail stores, and eventually, a consumer's table.

To fulfill their sustainability and traceability commitments, the various entities in the ecosystem may need to review patterns in the time-lines of events that are repeated across many participants, as opposed to analyzing every movement of every piece of machinery or every sensor output from every farm. Accordingly, some embodiments may include a system and method that can identify patterns of event timelines that are repeated across many farms and other entities, whereby those operations may also be profiled/characterized by a similar goal, crop, soil properties, budget, geographic data, etc. One feature and advantage of these embodiments is the ability analyze a large number of events in order to learn patterns of significance and to leverage those patterns' traceability. Another feature and advantage of some embodiments is a scalable system that can analyze raw sensor data from a particular field and calculate a significance likelihood with regard to traceability.

In some embodiments, the system may include an event analysis module that takes as input a series of events from time $t\_0$ thru $t\_n$. The system may then learn correlations, including correlations across time, in order to determine how significant a most recent occurring event was (or next event will be) in terms of traceability goals. To learn these event correlations, some embodiments may include training a neural network with a configurable memory capability, such as a long short-term memory (LSTM) network, to analyze an event history leading up to a certain current (or predicted) event.

For model training, some embodiments may consider multiple feature vectors that can characterize farm events over several days. One of the vectors may be used to profile a farm, field, and/or subfield based on attributes, such as size, last year's yield output, crops sowed, seed variety, etc. Another vector may be used to characterize events based on equipment's movement (e.g., a time series of latitude and longitude coordinates, a pattern of movement, etc.) and time-stamped or geo-stamped sensor readings (e.g., type, value, value characterization as high/med/low, etc.) from that piece of equipment. The model may use these vectors to learn internal/hidden representations, which may vary based on the planted crop, the field's location, etc. For example, a set of possible on-field event patterns for corn in the United States may be different than those for sugarcane/ratooning crops in Malaysia or beef operations in Australia.

Once the model is trained, it may be put into operation. In some embodiments, for each new event occurring on a particular field, the event analysis module may calculate a probability for whether the event has significance in terms of traceability. If the calculated probability "P" is greater than a predefined threshold (e.g., $P>0.8$), then the event may be automatically posted to an ledger. In some embodiments, the ledger may be a distributed ledger, such as a blockchain.

Data Processing System

Figure 1:
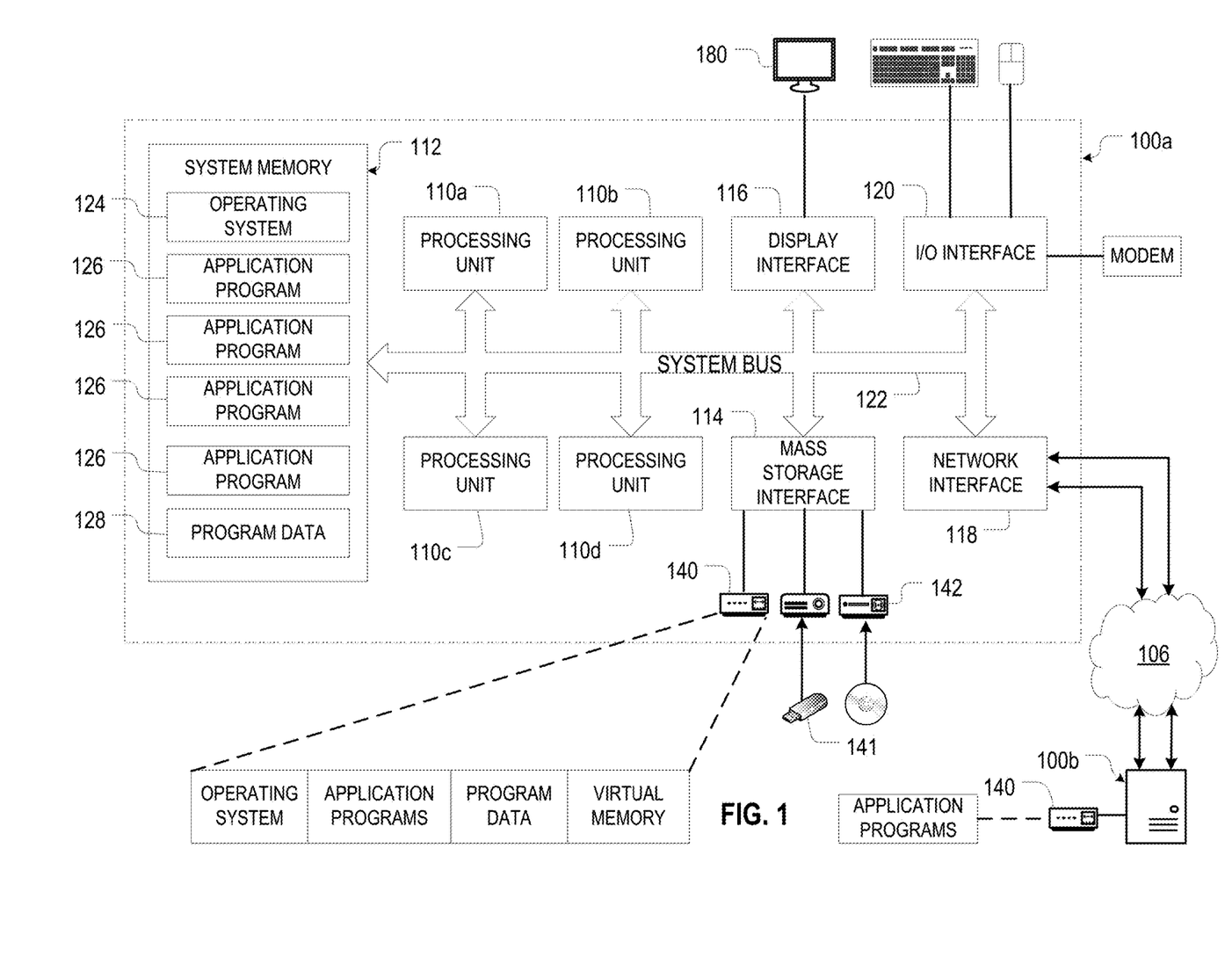
FIG. 1 is a block diagram of a data processing system (DPS) according to one or more embodiments disclosed herein.

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of central processing units 110a-110d (generically, processor 110 or CPU 110) that may be connected to a main memory unit 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a removeable Universal Serial Bus (USB) drive, and/or a readable/writable optical disk drive 142. The network interfaces 118 may allow the DPS 100a to communicate with other DPS 100b over the network 106. The main memory 112 may also contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media 142 that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage devices 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interface units 114, 116, 118, 120 in some embodiments may support communication with a variety of storage and I/O devices. The mass storage interface unit 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 may be used to directly connect one or more display units 180 to the data processing system 100. These display units 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
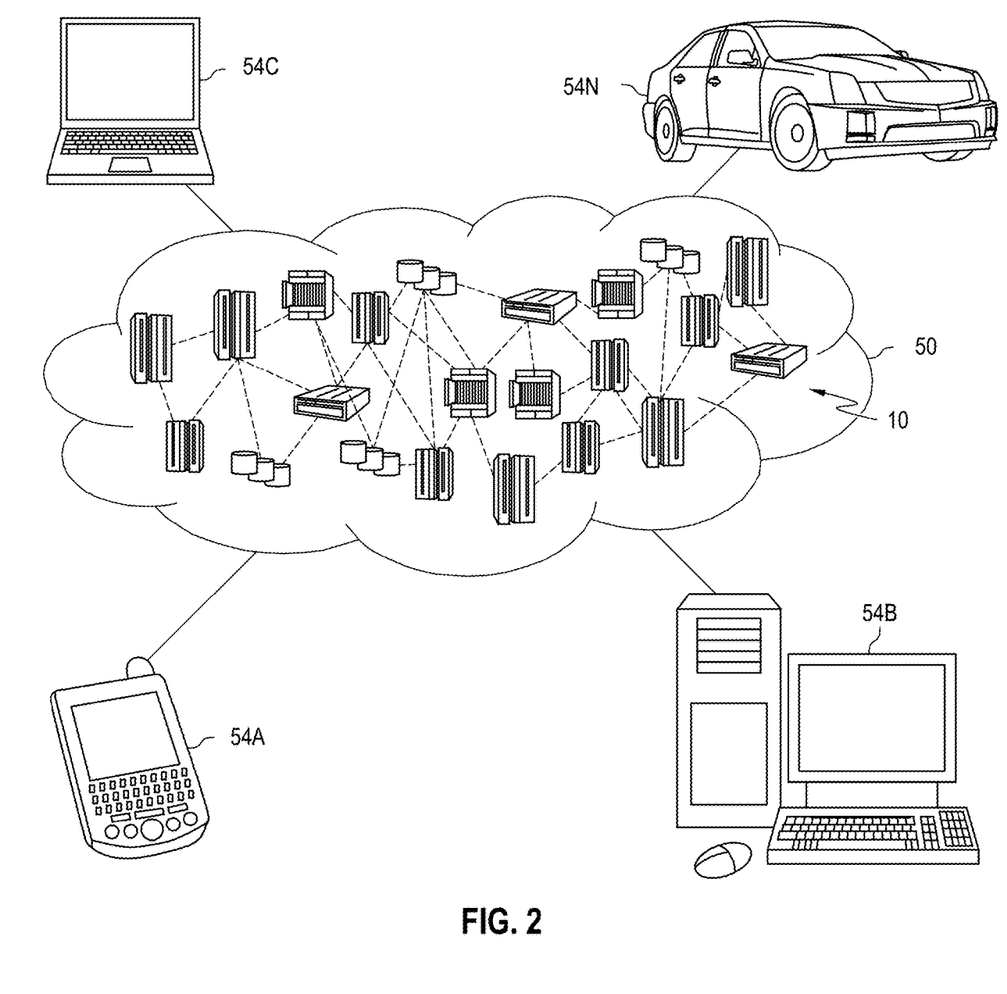
FIG. 2 depicts a cloud computing environment according to some embodiments.

FIG. 2 illustrates one embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
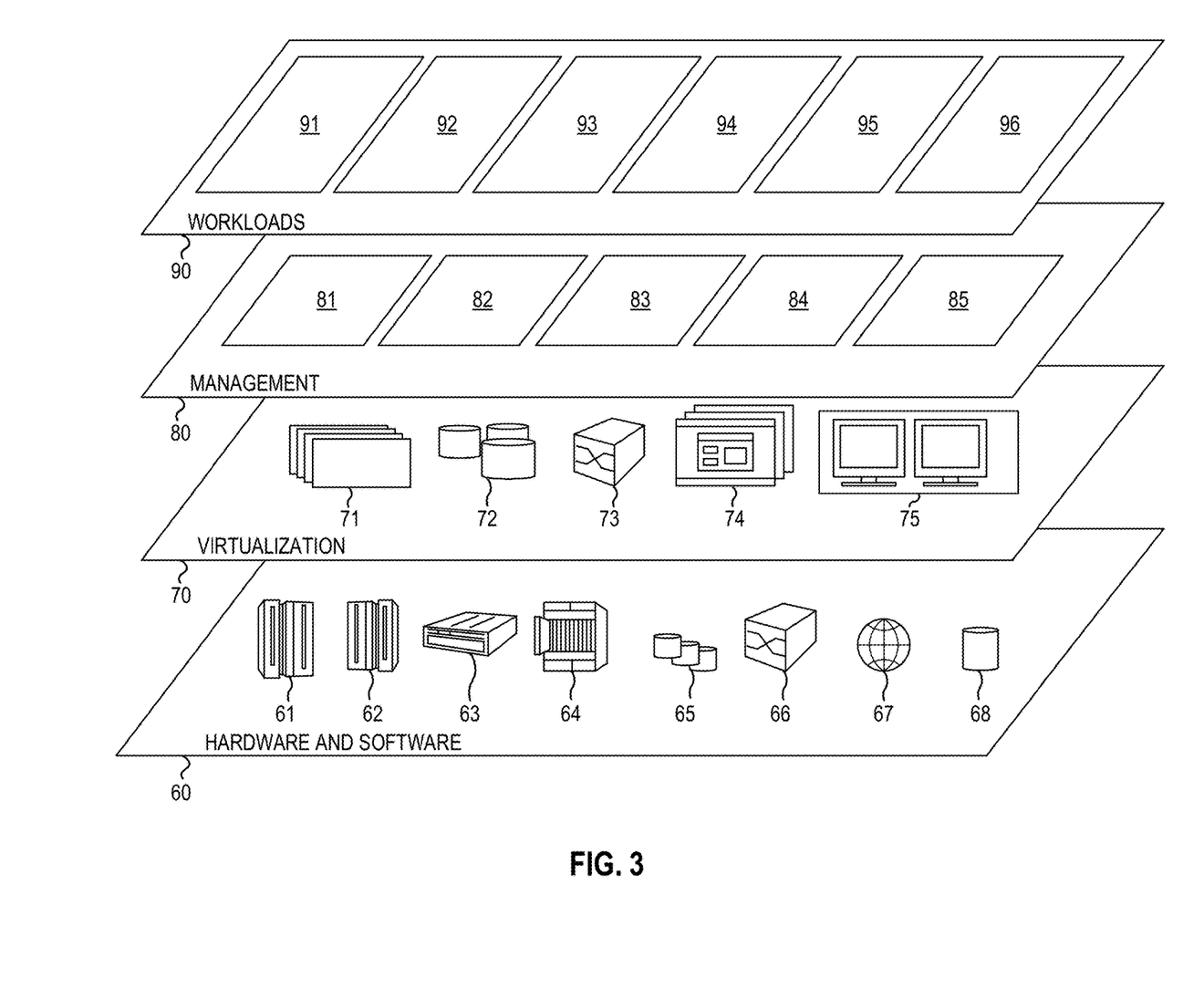
FIG. 3 depicts abstraction model layers according to some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event analysis module 96.

Event Analysis Module

Figure 4:
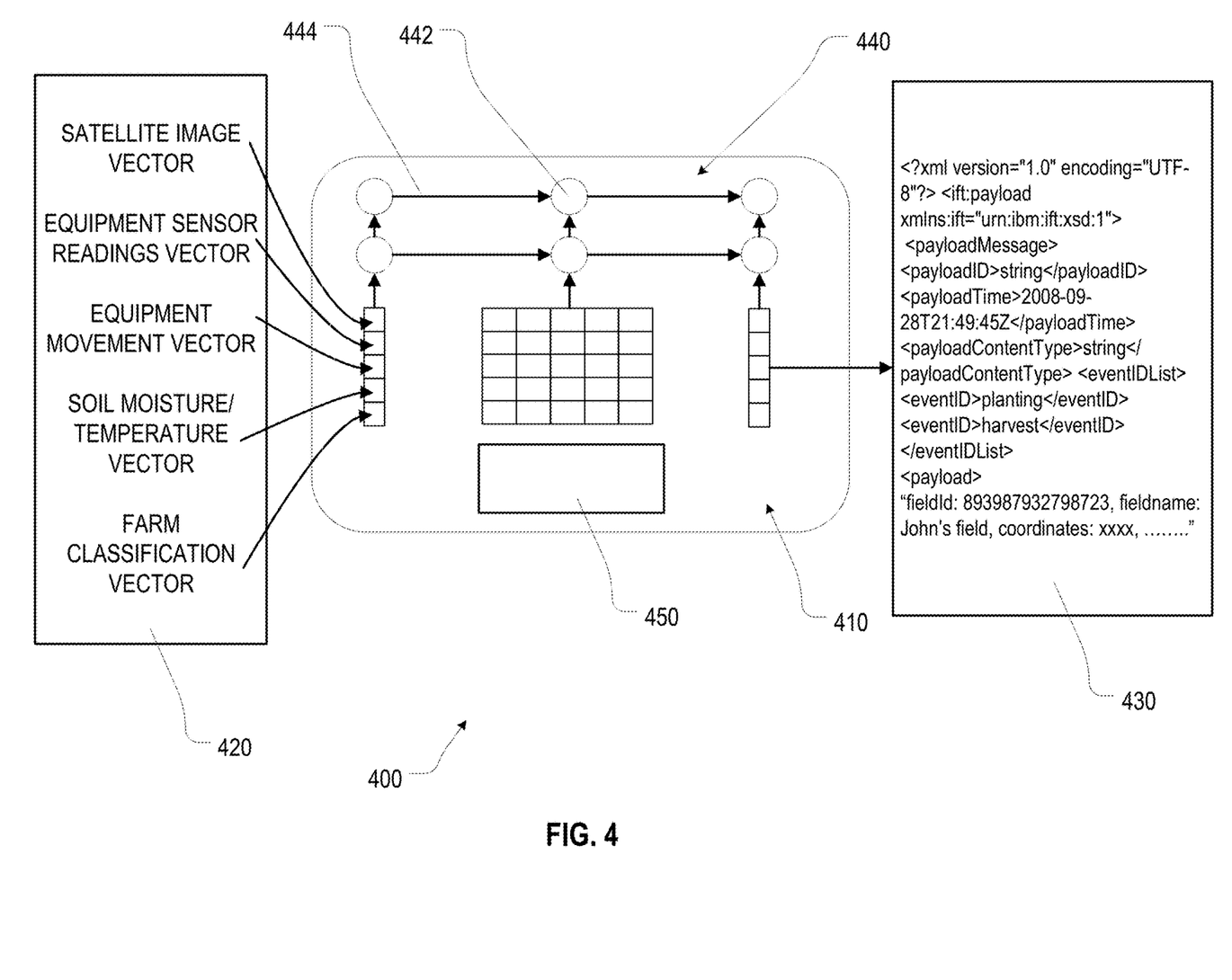
FIG. 4 is a system diagram for an event analysis module, consistent with some embodiments.

FIG. 4 is a system 400 diagram for an event analysis module 410, consistent with some embodiments. The system event analysis module 410 in FIG. 4 may receive as input a plurality of feature vectors 420 containing time stamped events from a plurality of different sources e.g., sensors, satellites, manual logs, etc. The system event analysis module 410 may comprise a list of events having a probability of significance greater than a threshold. The system event analysis module 410 may also output 430 a probability factor "P" representing a chance that a current event will be significant. The system event analysis module 410 may comprise a machine learning (ML) model 440 and a feature preparation module 450 executing on a DPS 100 within a cloud computing environment 50. The feature preparation module 450 may extract different features and/or metadata from the feature vectors 420 to assist the ML model 440 in identifying useful features. For example, the raw data in an illustrative application may be hourly soil moisture values. A feature-set derived from this data by the feature preparation module 450 may include mean, min, max, and variance of the soil moisture values on a weekly basis.

For illustrative purposes, the ML model 440 will be described with reference to a LSTM class ML model ("LSTM model"). LSTM models may be desirable because they can remember values over arbitrary time intervals. This, in turn, may allow for classifying events in input time series data for particular entities, as there may be lags of unknown duration between important events in the time series. However, other types of ML models are consistent with the disclosure, as are algorithmic models.

In some embodiments, the LSTM model may comprise a plurality of artificial cells 442 interconnected through connection points called gates 444. Each cell 442 in some embodiments may comprise an input gate, an output gate, and a forget gate. The cells 442 may be interconnected such that the output gate 444 of one cell 442 is the input gate of another cell 442

The cells 442 in some embodiments may be the sub-entity that remembers the values over the arbitrary time intervals, and the gates 444 may be the sub-entity that regulates the flow of information into and out of the cell. Each gate 444 in the LSTM model may further encode a strength of a relationship in the connection between the output of one cell 442 and the input of another cell 442. The output of each cell 442, in turn, may be determined by the aggregate input(s) received from other cells 442 that are connected to it via gates 444, and thus by the outputs of these "upstream" connected cells 442 and the strength of the connections as determined by numeric weights on the gates 444.

LSTM models may be trained to solve a specific problem (e.g., identification of significant events) by adjusting the weights of the gates 444 such that a particular class of inputs produces the desired output. This weight adjustment procedure in these embodiments is known as "learning." Ideally, these adjustments lead to a pattern of weights that, during the learning process, converge toward an optimal solution for the given problem based on some cost function. In some embodiments, the cells 442 may be organized into layers. The layer that receives external input data, e.g., feature vectors 420, is the input layer. The layer that produces the ultimate result (i.e., output 430) is the output layer. Some embodiments include a large number of hidden layers between the input and output layers, commonly hundreds of such hidden layers.

During an initial configuration phase, the event analysis module 410 in some embodiments may receive a training corpus. The training corpus may contain a set of training vectors from a plurality of different farms in a plurality of different geographic locations that are growing a plurality of different crops in a plurality of different years. The training corpus may further contain labels identifying a plurality of significant events. The labels may have been previously identified by an agriculture expert as significant events for traceability purposes that occurred at a particular farm, processor, shipper, etc. in a particular year.

During a subsequent execution phase, the event analysis module 410 may receive as input 420 a new corpus (i.e., unlabeled) describing a particular farm, processor, shipper, etc. The event analysis module 410 may use the new corpus to calculate as output 430 a list of potentially significant events that occurred at associated entity during the associated time period. The event analysis module 410 may also calculate a probability factor that one event in the new corpus is likely to be significant.

Training Phase

Figure 5:
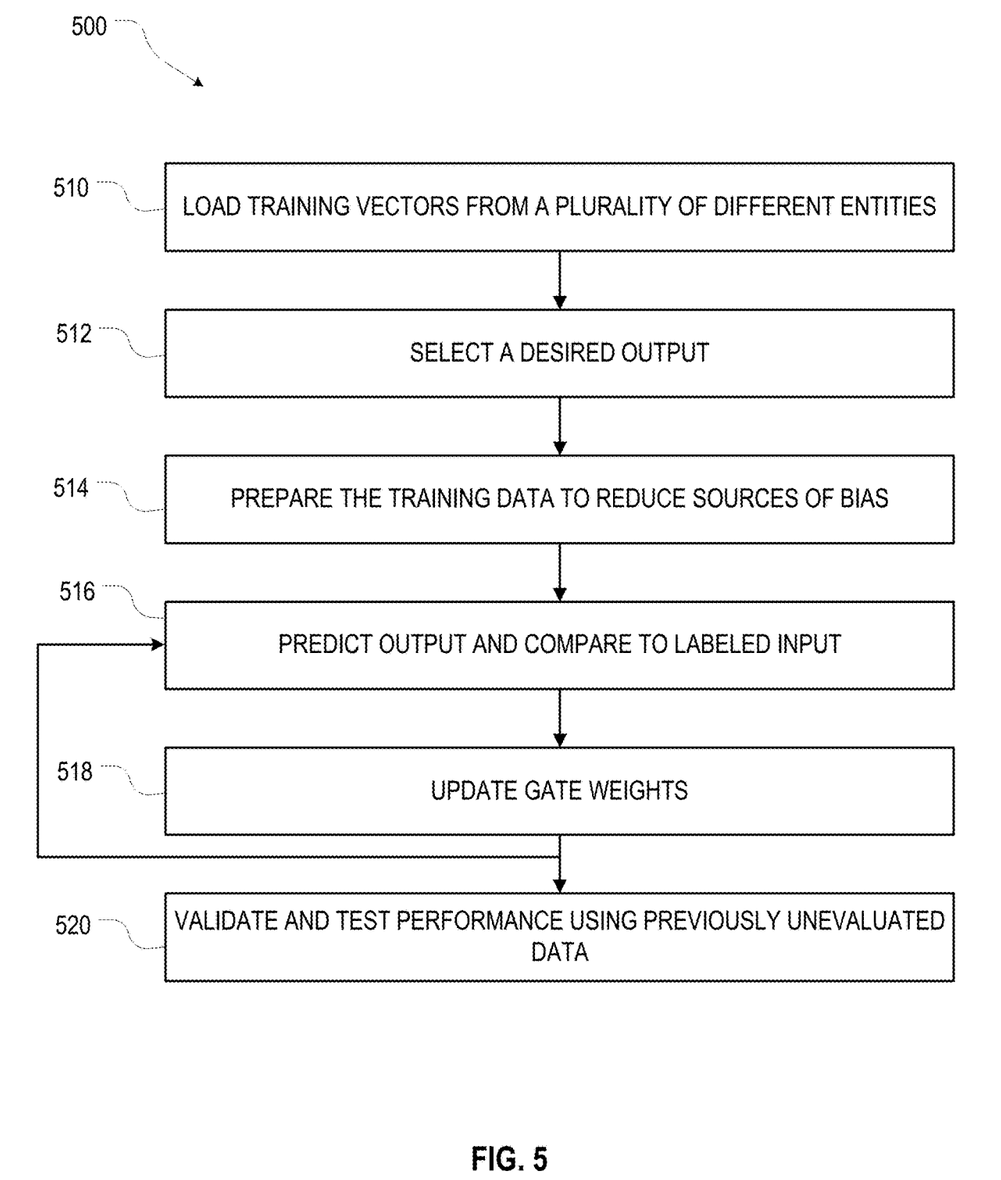
FIG. 5 is a flow chart illustrating one method of training the event analysis module embodiment, consistent with some embodiments.

FIG. 5 is a flow chart illustrating one method 500 of training the event analysis module 410 embodiment, consistent with some embodiments. A user may begin by loading training vectors from a plurality of different entities in the agricultural ecosystem at operation 510, and the underlying data may be collected throughout the agriculture supply chain, e.g., from static data about a particular farm, to pre-season activities at that farm (e.g., fleet/machinery selection, tillage, plantation records, field maps, etc.), to in-season activities at that farm (e.g., planting, field imagery for crop health, field level weather and soil monitoring, fertilizer application, fertilizer records and field maps, crop scouting, etc.), to post-season activities (harvest information, yield map, local storage, crop planning for next cycle, etc.), to storage activities (where, when, how long, type, etc.), to wholesale distribution activities, to final distribution activities (e.g., date delivered to a particular restaurant or supermarket, etc.). For example, for significance identification with respect to a farm, the training vectors may include static information such as: ownership information for a field, location information about a sub-field, physical information about a sub-field (e.g., elevation, slope), etc. The labeled training vectors for a farm may also include a time series of events that occurred at that farm, e.g., the particular seed type planted, daily weather, fertilization days and types, irrigation days and amounts, insecticide application dates and types, herbicide application dates and types, pruning events, and harvesting events (e.g., yield metrics, quality metrics, etc.). The training vectors may further include movement of particular machines (e.g., a planter, a truck) through the particular entity (e.g., a sub-field, a delivery route) together with time-stamped or geo-stamped outputs from various sensors on that equipment. The training vectors may further include where, how, and how long the product is stored (e.g., grain contract management). The training vectors may further include details about food processing (what facility received the product and on what date, what final product was produced, etc.), intermediate distribution (e.g., wholesale facilities), and final distribution(e.g., what supermarket or restaurant received the final product and on what dates, etc.)

In some embodiments, data for the training vectors may be automatically collected using Internet of Things sensors attached to various pieces of machinery and radio frequency identifier sensors attached to various inputs and outputs to those machines. The training vectors may also include remotely sensed information, such as images from a satellite or drone. For an agriculture processor, the training vectors may include information about where its various inputs were sourced (e.g., the field or sub-field), the specific trucks used to move the inputs and their load histories (e.g., what did they haul before the current input), the specific machines used to process the input and their processing histories, time-stamped operational settings for those processing machines, when any serviceable parts on those machines were last replaced (e.g., cutting blades), etc.

The training vectors in some embodiments may further include manually entered labels identifying which of the events an agriculture expert considered to be significant. These labels may, for example, include events that violate, or comply with, particular certification standards.

At operation 512, the user may select a desired output (e.g., a list of events having a significance above some threshold). At operation 514, the training data may be prepared to reduce sources of bias, typically including de-duplication, normalization, and order randomization. At operation 516, the initial weights of the gates 444 for the ML model may be randomized. At operation 518, the ML model may be used to predict an output using set of input data vectors, and that prediction is compared to the labeled data. The error (e.g., the difference between the predicted value and the labeled data) is then used at operation 520 to update the gate weights. Operations 516-518 may be repeated, with each iteration updating the weights, until the training data is exhausted, or the ML model reaches an acceptable level of accuracy and/or precision. At operation 522, the resulting model may optionally be compared to previously unevaluated data to validate and test its performance.

Execution Phase

Figure 6:
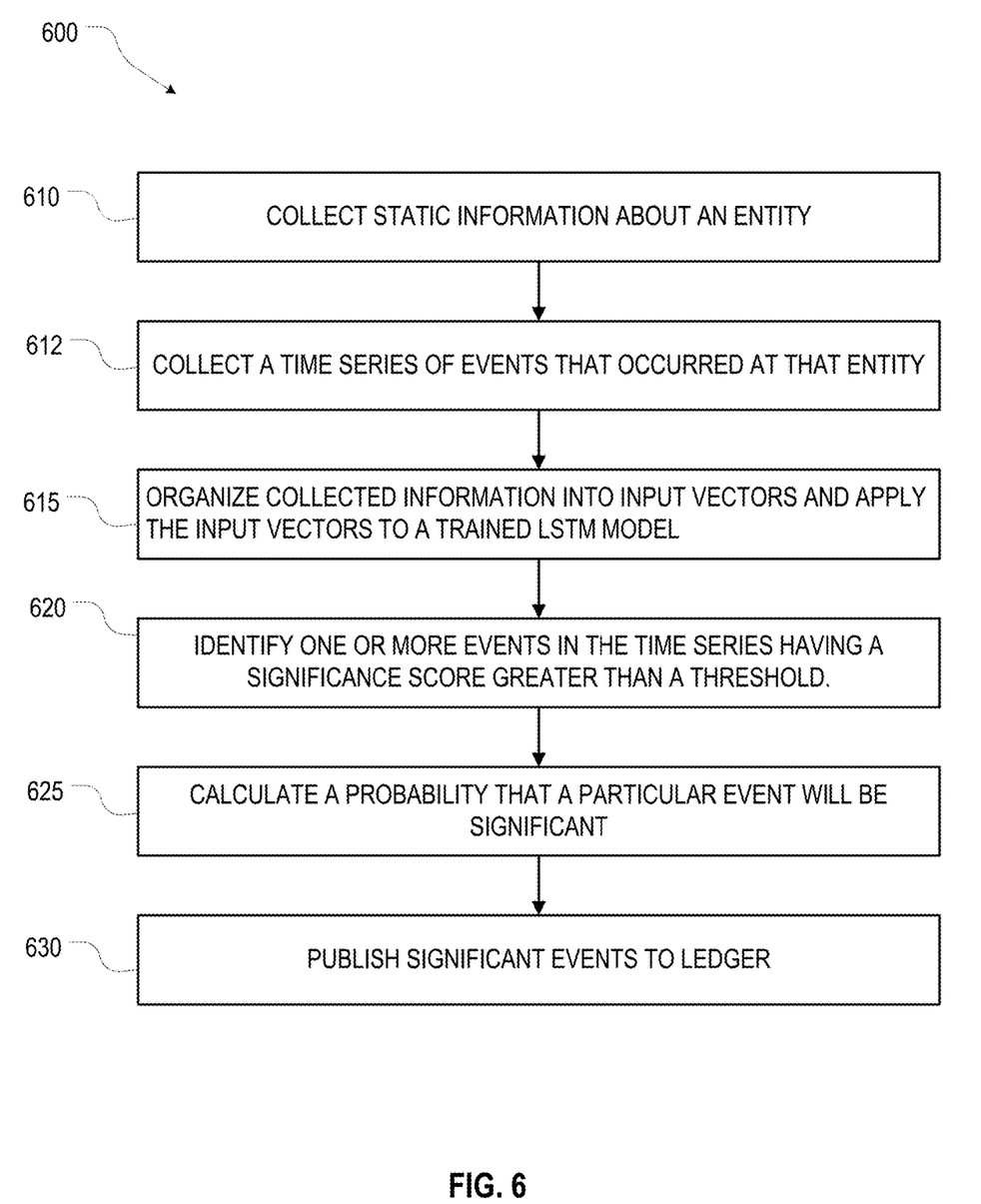
FIG. 6 is a flow chart illustrating one method of training the event analysis module, consistent with some embodiments and described with reference to a LSTM model for purposes of illustration.

FIG. 6 is a flow chart 600 illustrating one method of using the event analysis module 410, consistent with some embodiments and described with reference to a LSTM model for purposes of illustration. At operations 610-612, the event analysis module 410 may collect new static information about an entity in the agricultural ecosystem and a time series of events that occurred at that entity from time t_0 thru t_n. At operation 615, the event analysis module 410 may organize the collected information into input vectors and then apply the input vectors to a trained LSTM model.

At operation 620, the event analysis module 410 may use the trained ML model identify one or more events in the time series having a significance score (for purposes of traceability in this example) greater than a threshold. Additionally or alternatively, the event analysis module 410 may use the trained ML model to calculate a probability that a particular event (e.g., a next event in the series) will be significant for traceability at operation 625. Some embodiments may then publish those events where the determined significance was greater than the threshold value onto a ledger, such as a blockchain, at operation 630. In some embodiments, the event may be published as an XML transaction record in Table 1:

TABLE 1

<?xml version="1.0" encoding="UTF-8"?> <ift:payload xmlns:ift="urn:ibm:ift:xsd:1">
<payloadMessage> <payloadID>string</payloadID>
<payloadTime>2008-09-28T21:49:45Z</payloadTime>
<payloadContentType>string</payloadContentType> <eventIDList>
<eventID>planting</eventID>
<eventID>harvest</eventID>
</eventIDList>
<payload>
"fieldId: 893987932798723, fieldname: John's field, coordinates: xxxx, ........"

Advantageously in embodiments utilizing LSTM models, the event analysis module 410 may to take into consideration the event history leading up to each event in operations 620 and 625. This may allow these embodiments to detect hidden correlations between those events that occur early in a growing season/processing chain and those that occur later. Additionally, the feature preparation module 450 may be used to take into consideration several feature vectors that can help characterize farm events, over several days. For example, one such feature vector may be used to profile the farm based on attributes like {farm size, last year's yield output, crops sowed, seed variety, etc.}. Similarly, a different vector is used to characterize events based on farm equipment's movement (series of latitude/longitude coordinates, pattern of movement, etc.) and farm equipment's sensor reading (type, value=high/med/low).

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Service Model

Embodiments of the present invention may also be delivered as part of a service engagement with a client corporation, nonprofit organization, government entity, internal organizational structure, or the like. Aspects of these embodiments may include configuring a computer system to perform, and deploying software that implement, some or all of the methods described herein. Aspects of these embodiments may also include analyzing the client's operations, creating recommendations responsive to the analysis, generating software to implement portions of the recommendations, integrating the software into existing processes and infrastructure, metering use of the systems, allocating expenses to users of the systems, and billing for the use of the systems. This service engagement may be directed at providing both the cloud services and the cloud controller services, may be limited to only providing cloud controller services, or some combination thereof. Accordingly, these embodiments may further comprise receiving billing information from other entities and associating that billing information with end-users of the cloud.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A computer-based method for automatically identifying significant events for food traceability for use by a distributed agriculture supply chain, comprising:
    training a neural network to automatically identify significant events for food traceability, wherein the neural network comprises a plurality of artificial cells interconnected via a plurality of gates, and wherein each gate encodes a strength of a relationship in the connection between an output of one artificial cell and an input of another artificial cell, the training comprising:
        receiving training data, wherein the training data comprises labeled event data for a plurality of farms over a plurality of days;
        generating, by the neural network, a probability factor representing a chance that an event in the training data will be significant for food traceability; and
        comparing the generated probability to the received labels;
    in response to the comparison, updating the encoded strength of at least some of the gates;

receiving data from a plurality of sensors, wherein each of the sensors generates a series of events about a respective one or more of a plurality of agriculture supply chain entities;

automatically filtering, by the trained neural network, events in the plurality of series of events having a significance for food traceability less than a threshold; and automatically selectively transmitting, by a network interface, only the data associated with the unfiltered events to a plurality of blockchain nodes of a distributed ledger.

2. The method of claim 1, wherein:

the labeled event data comprises a plurality of feature vectors containing time stamped events from a plurality of different farms in a plurality of different geographic locations that are growing a plurality of different crops in a plurality of different years, and labels identifying a plurality of significant events among the feature vectors; and the event timelines are characterized by goal, crop, soil properties, budget, and geographic data.

3. The method of claim 2, wherein the neural network comprises a long short-term memory (LSTM) network.

4. The method of claim 3, wherein the LSTM network is adapted to consider event history leading up to a certain event in the training data.

5. The method of claim 3, wherein the LSTM network is adapted to consider a plurality of different feature vectors for each of the plurality of farms on each of the plurality of days.

6. The method of claim 5, wherein the plurality of feature vectors comprise a plurality of attributes chosen from the group consisting of a farm size, a last year's yield output, a type of crop sowed, and a seed variety.

7. The method of claim 6, wherein the plurality of feature vectors further comprise a series of latitude and longitude coordinates of a piece of equipment and a sensor reading.

8. The method of claim 1, wherein the blockchain establishes an auditable transaction trace involving multiple, independent companies in the distributed agriculture supply chain between a planting event and a final distribution event.

9. The method of claim 1, wherein the training data comprises labeled event data for a plurality of food processors over a plurality of days; and further comprising:

training the neural network to automatically identify patterns of event timelines that are repeated across the plurality of farms, characterized by goal, crop, soil properties, budget, and geographic data using the labeled event data for the plurality of food processors.

10. The method of claim 1, wherein the neural network is adapted to identify hidden representations in the series of events, and wherein the hidden representations vary based on a crop type.

11. A computer system for identifying significant events for food traceability for use by a distributed agriculture supply chain, the system comprising a processor communicatively coupled to a plurality of Internet of Things (IoT) sensors, the processor configured to execute instructions that, when executed on the processor, cause the processor to:

train a neural network to automatically identify significant events for food traceability, wherein the neural network comprises a plurality of artificial cells interconnected via a plurality of gates, and wherein each gate encodes a strength of a relationship in the connection between an output of one artificial cell and an input of another artificial cell, the training comprising:

receiving training data, wherein the training data comprises labeled event data for a plurality of farms over a plurality of days;

generating, by the neural network, a probability factor representing a chance that an event in the training data will be significant for food traceability; and comparing the generated probability to the received labels;

in response to the comparison, updating the encoded strength of at least some of the gates;

receive input data from a plurality of Internet of Things (IoT) sensors, wherein each IoT sensor is operatively coupled to at least one agriculture supply chain entity and wherein each of the IoT sensors generates a series of events about its associated entities;

calculate, using the trained neural network, a probability for whether each event in the series of events has significance in terms of traceability;

automatically filter events in the plurality of series of events having a calculated probability less than a threshold; and automatically selectively transmit, by a network interface, only the data associated with the unfiltered events to a plurality of blockchain nodes of a distributed ledger.

12. The system of claim 11, wherein the labeled event data comprises a plurality of feature vectors containing time stamped events from a plurality of different farms in a plurality of different geographic locations that are growing a plurality of different crops in a plurality of different years, and labels identifying a plurality of significant events among the feature vectors; and train the neural network to automatically identify patterns of event timelines that are repeated across the plurality of farms, characterized by goal, crop, soil properties, budget, and geographic data, wherein the training comprises:

presenting the plurality of feature vectors to the neural network;

generating, by the neural network, a probability factor representing a chance that a current event will be significant; and comparing the generated probability factor to the labels.

13. The system of claim 12, wherein the neural network comprises a long short-term memory (LSTM) network.

14. The system of claim 13, wherein the LSTM network is adapted to consider event history leading up to a certain event in the training data.

15. The system of claim 13, wherein the LSTM network is adapted to consider a plurality of different feature vectors for each of the plurality of farms on each of the plurality of days.

16. A computer program product for identifying significant events for food traceability for use by a distributed agriculture supply chain, the computer program product comprising a computer readable storage medium having program code embodied therewith, the program code executable by one or more processors, to perform a method comprising:

training a neural network to automatically identify significant events for food traceability, wherein the neural network comprises a plurality of artificial cells interconnected via a plurality of gates, and wherein each gate encodes a strength of a relationship in the connection between an output of one artificial cell and an input of another artificial cell, the training comprising:

receiving training data, wherein the training data comprises labeled event data for a plurality of farms over a plurality of days;

generating, by the neural network, a probability factor representing a chance that an event in the training data will be significant for food traceability; and comparing the generated probability to the received labels;

in response to the comparison, updating the encoded strength of at least some of the gates;

receiving data from a plurality of sensors, wherein each of the sensors generates a series of events about a respective one or more of a plurality of agriculture supply chain entities;

automatically filtering, by the trained neural network, events in the plurality of series of events having a significance for food traceability less than a threshold; and automatically selectively transmitting, by a network interface, only the data associated with the unfiltered events to a plurality of blockchain nodes of a distributed ledger.

17. The computer program product of claim 16, wherein:

the labeled event data comprises a plurality of feature vectors containing time stamped events from a plurality of different farms in a plurality of different geographic locations that are growing a plurality of different crops in a plurality of different years, and labels identifying a plurality of significant events among the feature vectors; and the event timelines are characterized by goal, crop, soil properties, budget, and geographic data.

18. The computer program product of claim 17, wherein the neural network comprises a long short-term memory (LSTM) network.

19. The computer program product of claim 18, wherein the LSTM network is adapted to consider event history leading up to a certain event in the training data.

20. The computer program product of claim 18, wherein the LSTM network is adapted to consider a plurality of different feature vectors for each of the plurality of farms on each of the plurality of days.

\* \* \* \* \*